2,960,465
LOW WATER LOSS AQUEOUS DRILLING FLUID

Karl C. ten Brink, Houston, Tex., assignor to Texaco Inc., a corporation of Delaware No Drawing. Filed July 30, 1957, Ser. No. 675,035

7 Claims. (Cl. 252—8.5)

This invention relates to drilling fluids. More particularly, this invention relates to aqueous drilling fluids characterized by a relatively low water loss.

One important requirement in an aqueous drilling fluid is low water loss. Conventional drilling muds comprising water and a bentonitic clay, such as a high yield Wyoming bentonite, exhibit a satisfactory relatively low water loss. However, when these muds become contaminated by the presence of electrolytes therein, such as the water soluble salts sodium chloride, calcium chloride, calcium sulfate, etc., the water loss properties of these muds become unsatisfactory, i.e., the water or filtrate loss of these muds into permeable formations in contact therewith during a drilling operation increases. A number of materials have been suggested to be added to these muds in order to reduce water loss. These materials are usually organic in nature, e.g., hydrolyzed starch, water-dispersible gums, carboxymethylcellulose (CMC) and the like. Since these materials are organic in nature they tend to decompose upon bacteria attack or fermentation or otherwise undergo degradation or decomposition due to the adverse drilling and well bore conditions. Further, another disadvantage of the use of these materials is their relative expense.

Accordingly, it is an object of this invention to provide an improved aqueous drilling fluid characterized by a relatively low water loss.

Still another object of this invention is to provide an improved water loss additive for use in aqueous drilling fluids.

Another object of this invention is to provide an improved drilling method employing an aqueous drilling fluid prepared in accordance with the teachings of this invention.

Yet another object of this invention is to provide a stable, relatively inexpensive material for improving (decreasing) water loss in an aqueous drilling fluid.

It has now been discovered that an aqueous drilling fluid comprising an oil-wettable drilling clay therein exhibits a relatively low water loss. More particularly, it has now been discovered that oil-wettable drilling clay, such as an oil-wetted bentonitic or attapulgite clay, is useful as a water loss additive or improver in aqueous drilling fluids.

Drilling clay, such as Wyoming bentonite and attapulgite, is normally a water-wettable material and readily disperses in water to yield a viscous, sometimes gel-like fluid. The use of water-wettable drilling clay, such as Wyoming bentonite, in aqueous drilling fluids in order to impart desired viscosity and/or fluid loss properties in aqueous drilling fluids is well known, see particularly Rogers—"Composition and Properties of Oil Well Drilling Fluids," revised edition, published 1953 by Gulf Publishing Company, Houston, Texas, U.S.A. The disclosures of the above-identified publication, particularly with respect to the composition and properties of a bentonitic and attapulgite clay and their use in an aqueous drilling fluid, are herein incorporated and made part of this disclosure.

Various materials may be employed in the practice of this invention in order to render a normally water-wettable drilling clay preferentially oil-wettable. Suitable agents which may be employed to treat a bentonitic clay, such as Wyoming bentonite, to render the same preferentially oil-wettable, include the water soluble lead salts, such as lead acetate, lead formate, etc., various relatively high molecular weight alkyl ammonium compounds such as cetyl trimethyl ammonium bromide, cetyl triethyl ammonium bromide, dodecyl trimethyl ammonium bromide, silicon-containing compounds of materials which tend to deposit a hydrophobic (oleophilic) silicone coating on the clay particles such as the various halosilanes, e.g., the dialkyl silicone dichlorides, specifically diethyl dichlorosilane, trimethyl chlorosilane and the like, which upon hydrolysis yield preferentially oil-wettable silicone compounds or silicones. Other materials which are useful in imparting oil-wettability to drilling clays include the rosin amines (primary rosin amines) and the salts of a rosin amine. The lower fatty acid salts of a rosin amine are particularly useful for this purpose. The lower fatty acid rosin amine salts include rosin amine formate, rosin amine acetate, rosin amine propionate, rosin amine butyrate. Other rosin amine salts such as the water soluble mineral acid salts of rosin amine, e.g., rosin amine hydrochloride and rosin amine salt of sulfuric acid, are also effective. Particularly useful in the practice of this invention is a commercial product sold by Hercules Products Company under the trade name Rosin Amine D Acetate.

The agent which is utilized in accordance with the teachings of this invention to render the bentonitic clay preferentially oil-wettable is employed in an amount at least sufficient to render substantially all of the bentonitic clay undergoing treatment preferentially oil-wettable. The actual weight amounts involved will depend upon the molecular (equivalent) weight of the treating agent and the purity or activity of the bentonitic clay being treated and also, to some extent, upon the manner and form of treatment.

Any suitable amount of the preferentially oil-wettable drilling clay, preferably an oil-wetted bentonitic clay, may be employed in an aqueous drilling fluid in accordance with this invention provided the amount is sufficient to effect a significant reduction in the water loss properties of the aqueous fluid undergoing treatment and/or containing the same. Usually a minor amount in the range 0.2–25%, more frequently in the range of 0.5–10%, by weight, more or less, of the preferentially oil-wettable bentonitic clay in the aqueous drilling fluid is sufficient to effect a substantial and/or significant reduction in the water loss properties of the drilling fluid as compared with substantially the same mud in the absence of the added oil-wettable bentonitic clay.

The following examples are illustrative of the practice and advantages obtainable in the practice of this invention.

Example I

A 6% by weight dispersion of hydratable (water-wettable) Wyoming bentonite in water was treated with lead acetate in an amount equivalent to about 5.0% by weight of the resulting admixture. The resulting treated bentonitic clay was recovered by filtration and after drying was found to be readily oil-wettable and would not redisperse in water. Indeed, some of the resulting treated oil-wettable bentonite floated on the surface of the water and apparently was no longer hydratable. This oil-wettable bentonite was then wetted with a small amount of kerosene. Following the foregoing treatment 1% by weight of the treated oil-wetted bentonite was added to a 6% by weight suspension of a water-wettable bentonitic clay in water which contained 50,000 parts per million (p.p.m.) sodium chloride dissolved therein. It was observed that the addition of this small amount of oil-wet bentonite reduced the fluid loss of the bentonite in water suspension by about 17%, as compared to a fluid loss reduction of about 24% by the addition of the same amount by weight of a hydrolyzed starch (Impermex)

added to a similar amount of the test bentonite in aqueous sodium chloride suspension.

*Example II*

A suspension of bentonite in water, as described in Example I, was similarly treated with lead acetate but instead of filtering the suspension and drying the treated clay, kerosene was directly added to the aqueous lead acetate solution containing bentonite dispersed therein. After suitably agitating the kerosene within the suspension the bentonite was separated by filtration. The recovered oil-wetted bentonite in an amount equivalent to about 1.5% by weight of the resulting admixture was added to a 6% by weight water-wettable bentonite suspension in a 5% by weight aqueous sodium chloride solution. It was observed that the filter loss or filtration properties of the resulting admixture was improved by virtue of a filter loss reduction of about 29% as compared with substantially the same bentonite suspension in the absence of the added oil-wetted bentonite.

*Example III*

Experiments similar to those carried out in Examples I and II were performed employing a rosin amine, actually Rosin Amine D, a high molecular weight primary rosin amine sold by Hercules Products Co., as the bentonite treating agent. More particularly, a 6% hydrated bentonite suspension in water was treated with an amount of hydrochloric acid sufficient to reduce the pH of the aqueous suspension to about 2.5, thereby converting the bentonite to an acid bentonite. The resulting acid bentonite was then treated by adding an amount of Rosin Amine D sufficient to render the bentonite preferentially oil-wettable and such that the pH of the aqueous suspension containing the resulting oil-wettable bentonite reached a value of about 7.5.

The resulting oil-wettable bentonite was separated by filtration and after washing was admixed with 300 ccs. of kerosene. 100 ccs. of the resulting admixture were mixed with 300 ccs. of a 6% by weight suspension of water-wettable bentonite in water. A fluid loss of the resulting suspension was reduced by about 57%. When the same amount of the aforesaid admixture was added to a similar amount of water-wettable bentonite suspension in water containing about 50,000 p.p.m. salt (NaCl) the fluid loss of the resulting suspension containing the treated oil-wettable bentonite was reduced by about 40%.

The foregoing experiments were repeated and it was observed that in the case of the water suspension the fluid loss was reduced by about 51% and in the case of the salt-containing suspension the water loss was reduced by about 43%.

*Example IV*

Further tests were carried out employing a rosin amine acetate (acetate salt of a primary rosin amine) as the bentonite treating agent wherein the rosin amine acetate was added directly to a suspension of normally water-wettable bentonite in an aqueous saline solution followed by the addition of a small amount of a hydrocarbon liquid, such as oil, e.g., kerosene or diesel oil. The resulting admixture was tested for fluid loss and it was observed that substantially identical results as those obtainable in accordance with the practice of this invention as set forth in Example III were obtained. It was observed that the simple use of a hydrocarbon liquid, such as a light lube oil, fuel oil or kerosene and the like, in order to form an oil-in-water emulsion in a water and bentonite solution was found to be ineffective in lowering filter loss of the resulting admixture.

Although the foregoing tests were carried out employing an aqueous solution containing 5% by weight sodium chloride the advantages obtainable in the practice of this invention are also obtainable in relatively more concentrated or less concentrated saline solutions, e.g., as low as 1% by weight and as high as 25% by weight dissolved salts. In the practice of this invention there may be also present in the aqueous drilling fluid containing the oil-wettable or oil-wetted bentonitic clay various other materials conventionally found in drilling fluids such as viscosity reducing agents, e.g., quebracho, calcium lignosulfonate and the like, weighting agents such as barium sulfate, iron oxide and the like, drilling clay materials such as water-wettable or dispersible bentonitic clays, e.g., Wyoming bentonite, lime and various electrolytes such as water soluble phosphates and polyphosphates, and other water soluble alkali metal and alkaline earth metal salts.

As will be apparent to those skilled in the art many substitutions, changes and alterations are possible in the practice of this invention without departing from the spirit or scope thereof.

I claim:

1. A water base drilling fluid characterized by a relatively low water loss containing a drilling clay dispersed in water together with an amount of a hydrocarbon oil-wetted bentonitic clay in the range of 0.2–25% by wt. based on said drilling fluid.

2. A water base drilling fluid characterized by a relatively low water loss comprising a drilling mud clay dispersed in water containing admixed therein a hydrocarbon oil, bentonitic clay and a salt of rosin amine, said bentonitic clay being present in an amount in the range 0.2–25% by wt. based on said drilling fluid.

3. In the drilling of a bore hole through an underground formation wherein a water base drilling fluid is passed through the bore hole in contact with said formation during the drilling operation, the improvement which comprises employing as said aqueous drilling fluid a drilling fluid containing a drilling clay dispersed in water, said drilling clay being dispersed in the water together with an amount of a hydrocarbon oil-wetted bentonitic clay in the range 0.2–25% by wt. based on said drilling fluid.

4. In the drilling of a bore hole through an underground formation wherein a water base drilling fluid is passed through the bore hole in contact with said formation during the drilling operation, the improvement which comprises employing as said drilling fluid a drilling fluid which comprises a drilling clay, water, said drilling clay being dispersed in the water in admixture with a hydrocarbon oil and an amount of a preferentially hydrocarbon oil-wettable bentonitic clay in the range 0.2–25% by wt. based on said drilling fluid.

5. In the drilling of a bore hole through an underground formation wherein a water base drilling fluid is passed through the bore hole in contact with said formation during the drilling operation, the improvement which comprises employing as said drilling fluid an admixture comprising drilling clay, water, a hydrocarbon oil, bentonitic clay and an amount of an agent which renders bentonitic clay preferentially hydrocarbon oil-wettable, said bentonitic clay being present in an amount in the range 0.2–25% by wt. based on said drilling fluid.

6. A method in accordance with claim 5 wherein said agent is lead acetate.

7. A method in accordance with claim 5 wherein said agent is rosin amine acetate.

References Cited in the file of this patent

UNITED STATES PATENTS

| | | |
|---|---|---|
| 2,354,203 | Garrison | July 25, 1944 |
| 2,531,440 | Jordan | Nov. 28, 1950 |
| 2,531,812 | Hauser | Nov. 28, 1950 |
| 2,606,871 | Ten Brink | Aug. 12, 1952 |
| 2,633,919 | Bauer et al. | Apr. 7, 7953 |
| 2,675,353 | Dawson | Apr. 13, 1954 |
| 2,776,112 | Ilfrey et al. | Jan. 1, 1957 |
| 2,797,196 | Dunn et al. | June 25, 1957 |